Feb. 18, 1930.                H. SUNDSTEDT                1,747,334
                POWER DISTRIBUTION SYSTEM FOR AIRCRAFT
                    Filed March 29, 1928      2 Sheets-Sheet 1

INVENTOR.
Hugo Sundstedt,
BY
A. H. Loughridge
ATTORNEY.

Feb. 18, 1930. H. SUNDSTEDT 1,747,334
POWER DISTRIBUTION SYSTEM FOR AIRCRAFT
Filed March 29, 1928 2 Sheets-Sheet 2
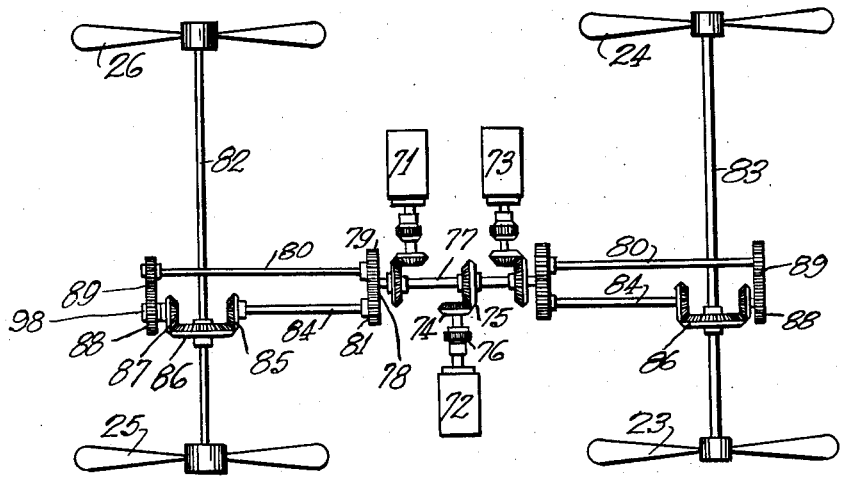
Fig. 3
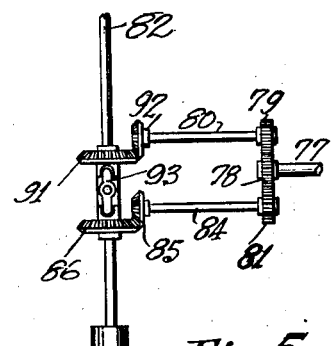
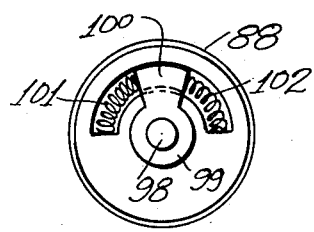
Fig. 4
Fig. 7
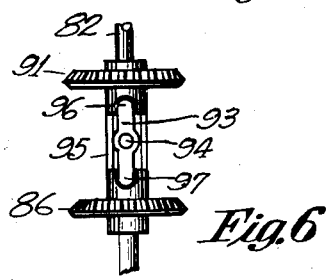
Fig. 5
Fig. 6
INVENTOR.
Hugo Sundstedt,
BY
M. H. Loughridge
ATTORNEY.

Patented Feb. 18, 1930

1,747,334

UNITED STATES PATENT OFFICE

HUGO SUNDSTEDT, OF NEW YORK, N. Y.

POWER-DISTRIBUTION SYSTEM FOR AIRCRAFT

Application filed March 29, 1928. Serial No. 265,582.

This invention relates to airplane constructions and more particularly to the system of power distribution from the motors to the propeller shafts and includes certain novel constructions which increase the safety of planes, reduces the weight, balances the load and secures a low centre of gravity. Other objects of the invention will be understood from the detailed description in the following specification and the drawings forming a part hereof, in which:

Fig. 1, is a plan view of a monoplane with the fuselage shown in section showing the arrangement of the motors, Fig. 2, is a front elevation corresponding to Fig. 1, Fig. 2ª, is a detail showing the construction of the pontoons, Fig. 3, is a layout in diagram form showing the motors and shafting to the propeller shafts, Fig. 4, is a part layout of the shafting arrangement in Fig. 3, shown partly in elevation;

Fig. 5, is a modification of the shafting arrangement,

Fig. 6, is an enlarged view showing a "floating" connection between the drive shafts and the propeller shafts, Fig. 7, is an enlarged view showing a yielding connection between the drive shaft and propeller shaft.

Figure 1:
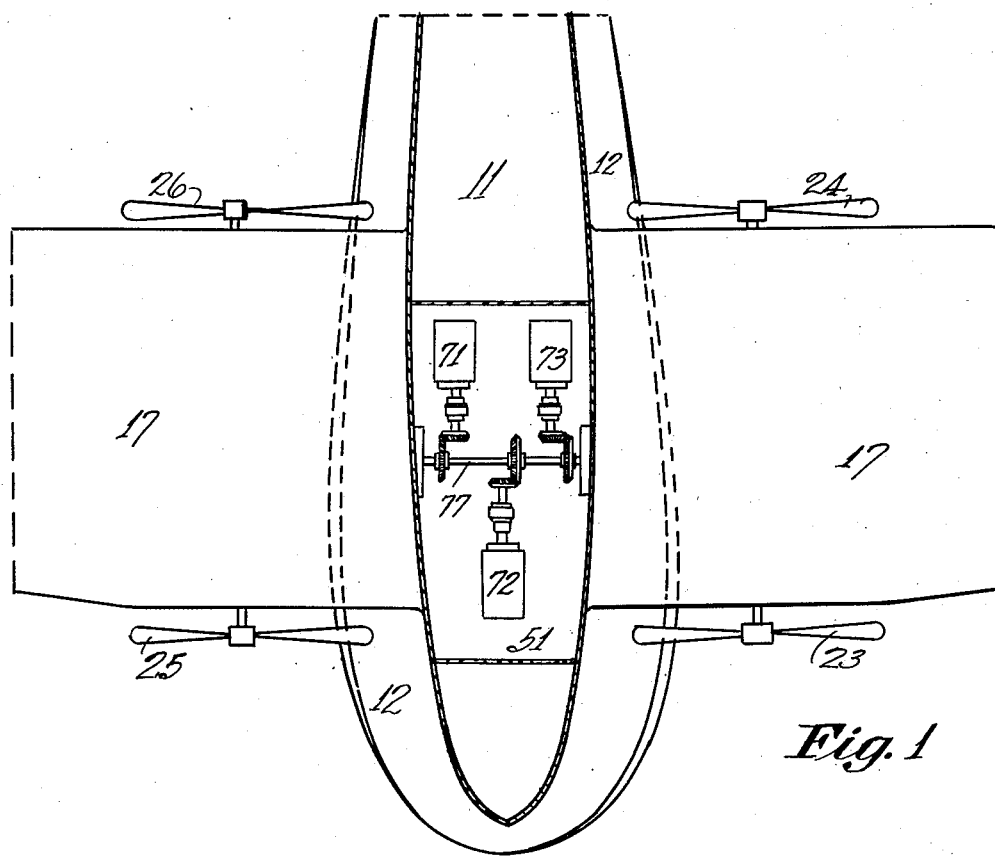

The features of this invention may be used with any of the different types of air craft in general use. The illustrations show a hydroplane of comparatively large capacity using two or more propellers. This application is a continuation in part of my co-pending application Serial No. 123,053, filed July 17, 1926.

This invention comprises a power arrangement for aircraft in which a pair of propellers spaced from the fuselage are driven by a power plant located in the fuselage through suitable shafts and gearing. As these shafts are located at right angles to each other bevel gearing is necessary to connect the drive with the propeller shaft. In order to reduce the weight of this gearing as much as possible it is balanced by a drive on opposite sides and connected by separate shafts with the main drive shaft. A floating or yielding connection is preferably provided between the drive shafts and the propeller shaft with the object of distributing the load between these shafts. The gearing is so arranged that the engines and main shaft may be located on a lower plane than the propeller shafts thereby lowering the centre of gravity of the machine.

The plane is provided with a pair of pontoons projecting from the lower side of the fuselage and below the fuselage so that a clear water passage is provided between the pontoons and below the floor of the fuselage. Across this passage, at intervals, preferably, at the pontoon ventilators, I provide planes of wing formation which are found to greatly facilitate the rising of the plane from the water as well as aid the wings in the buoyancy of the plane when in the air.

In the drawings 11 is the fuselage, 12 is the pontoons, 17 and 19 are the wings, 23 and 24 are one set of propellers and 25 and 26 are the other set of propellers. The motors 71, 72 and 73 are suitably geared to the main shaft 77 and connected with the propeller shafts by means hereinafter described in detail. The pontoons are built into the fuselage and project in either side therefrom as at 57, Fig. 2 and are connected to the wings by the stays 27.

Figure 2:
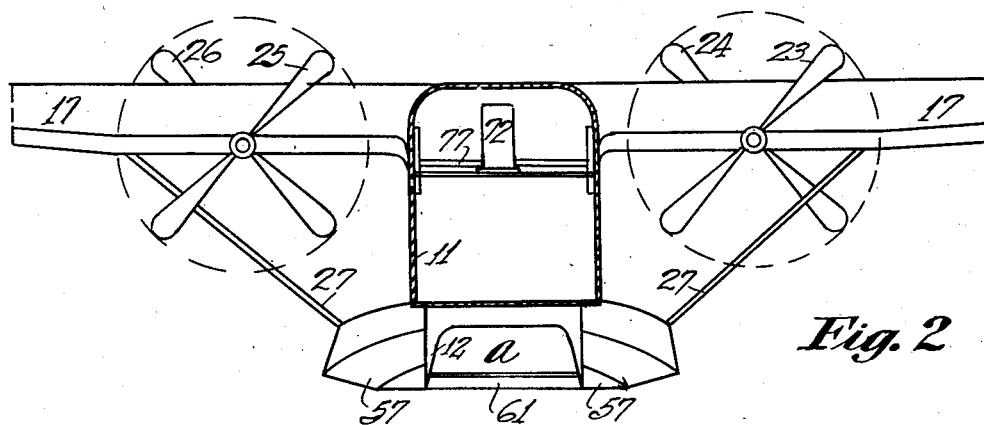
Figure 2A:
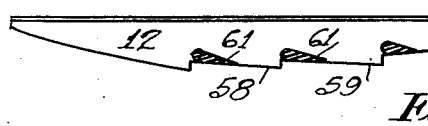

The base of the pontoons is constructed in inclined stages as indicated at 58—59, Fig. 2ª and more particularly described in the co-pending application referred to. Across the space a between the pontoons the small planes 61 of stream line formation are provided one plane, preferably being used for each of the inclines 58, 59, etc. These planes aid in lifting the pontoons from the surface of the water and assist the wings in the buoyancy of the plane when in the air.

In the power distribution diagram, Fig. 3, the motors are connected to the main shaft 77 through friction clutches 76 and the bevel gears 74—75. The friction clutches enables any motor to be disconnected from the main shaft as desired.

On the main shaft 77 the spur gear 78 is mounted which is independently in mesh with the gears 79 and 81 which are thereby rotated at the same speed and in the same direction. Shaft 80 is connected with the gear 79 and shaft 84 is connected with the gear 81. The propeller shaft 82 has mounted thereon the bevel gear 86 which is engaged at one side by the bevel gear 85 on shaft 84, and is engaged on the opposite side by bevel gear 87 connected with the spur gear 88 in mesh with the gear 89 on shaft 80.

It will be noted from Fig. 4 that the shaft 84 is in line with the shaft 82 and that the shaft 80 is located in a plane above the shaft 82 and therefore passes over this shaft and is thus able to connect with the bevel gear 86 on the side opposite to shaft 84. The spur gears 88—89 reverse the direction of rotation of 87 realtive to shaft 80 and thus maintains the proper conditions for the drive.

In this construction the torque on the bevel gear 86 is balanced and the driving power is equally divided between the gears 85 and 87 with the result that the large gear 86 can be of a comparatively light construction. As the power is transmitted through shafts 80 and 84, each of these shafts can be lighter than a single shaft conveying the same power and are therefore much better adapted for high speed operation than a comparatively heavy single shaft would be. Dividing the power between a pair of shafts provides an increased measure of safety in case one of the shafts should break as the other shaft remains in position to carry the load. With proper design, the pair of shafts and the high speed operation contemplated will transmit the power to the propeller shaft and be less weighty than a single shaft operated at lower speed. It will be observed from Fig. 4 that the gear 78 is below the gears 79 and 81 and in consequence, the main shaft 77 is located on a lower plane than the shafts 80—84 with the result that the motors are lowered in the fuselage and a lower centre of gravity is secured for the plane.

The shaft 83, Fig. 3 for the opposite set of propellers is driven from the main shaft 77 by a gear arrangement and a pair of counter shafts corresponding to that described and similarly referenced.

In Fig. 5 a modified form of drive is shown using a pair of shafts connecting the main shaft with the propeller shaft. The shafts 80 and 84 are located on the same plane as shaft 82. The latter is provided with an additional bevel gear 91 which connects to the shaft 80 through the bevel gear 92 so that the load is equally distributed between the shafts 80 and 84 and the bevel gears 86 and 91.

Since the power is divided between a pair of shafts it is necessary, in practice, to provide a yielding connection, or a floating connection between these shafts so that the load may be equally distributed between them and to prevent one shaft from driving the other.

One arrangement for securing this result is illustrated in Fig. 6 in which the bevel gears 86 and 91 are loosely mounted on shaft 82 but are connected through their hubs by the floating lever 93 pivoted at 94 to the sleeve 95 which is keyed to shaft 82. The end 96 of lever 93 engages a jaw in the hub of 91 and the opposite end 97 engages a similar jaw in the hub of 86. In this arrangement it is apparent that if one of the bevel gears moves faster than the shaft 82 the lever 93 will rotate the other gear in the opposite direction thus distributing the load between the shafts.

Fig. 7 shows an alternative arrangement for securing this result in which the gear 88, for instance, is loosely mounted on a hub 99 keyed to shaft 98. An arm 100 extending from the hub 99 moves in an arcuate recess in wheel 88 and is restrained against movement in either direction relative to the wheel by the springs 101 and 102. This introduces a yielding connection in the drive of one of the shafts which distributes the load between the shafts.

Having thus described my invention, I claim:

1. In a power distribution system for aircraft, the combination, a fuselage and a wing structure, a motor and main shaft in said fuselage, a propeller shaft supported by said wing and a plurality of counter-shafts connected in multiple between said main shaft and said propeller shaft.

2. In a power distribution system for aircraft, the combination, a fuselage and a propeller with a propeller shaft, a motor and main shaft in said fuselage, a plurality of counter-shafts connected in multiple between said main shaft and said propeller shaft and a yielding member embodied in at least one of said connections.

3. In a power distribution system for aircraft, the combination, a fuselage and a propeller with a propeller shaft, a motor in said fuselage, a main shaft operatively connected with said motor, said main shaft located at right angles to said propeller shaft, a plurality of counter-shafts operatively connecting said main shaft with said propeller shaft in multiple and a bevel gear connecting said counter-shafts with said propeller shaft.

4. In a power distribution system for aircraft, the combination, a fuselage and a propeller with a propeller shaft, a motor in said fuselage, a main shaft located at right angles to said propeller shaft and on a lower plane and operatively connected with said motor, a plurality of counter shafts operatively connecting said main shaft with said propeller shaft, one of said counter-shafts being located in the plane of said propeller shaft and the other counter shaft being located outside the plane of said propeller shaft and a bevel gear connecting said counter shafts to said propeller shaft.

5. In a power distribution system for aircraft, the combination, a fuselage and a propeller with a propeller shaft, a motor in said fuselage, a main shaft operatively connected with said motor, a plurality of counter shafts operatively connecting said main shaft with said propeller shaft and a floating connection between said counter shafts.

6. In a power distribution system for aircraft, the combination, a fuselage, a motor in said fuselage, a main shaft operatively connected with said motor, a pair of propellers, one on each side of said fuselage, a propeller shaft for each propeller located at right angles to said main shaft, a plurality of countershafts connected in multiple between each propeller shaft and said main shaft and bevel gears connecting said counter-shafts with said propeller shafts.

7. In a power distribution system for aircraft, the combination of a body with a propeller and a remotely located motor, a drive for said propeller comprising a plurality of counter-shafts connected in multiple between said motor and said propeller and means for balancing the load between said counter-shafts.

8. In a power distribution system for aircraft, the combination of a body with a propeller and a remotely located motor, a drive for said propeller comprising a plurality of counter-shafts connected in multiple between said motor and said propeller and a single gear on the shaft of said propeller connected with said counter-shafts.

9. In a power distribution system for aircraft, the combination of a body with a propeller and a remotely located motor, a drive for said propeller comprising a plurality of counter-shafts connected in multiple between said motor and said propeller, said drive embodying a single gear wheel connecting on its opposite sides with said counter-shafts, and means for balancing the load between said counter-shafts.

In testimony whereof I affix my signature.

HUGO SUNDSTEDT.